(12) United States Patent
Moosavi et al.

(10) Patent No.: US 10,361,812 B2
(45) Date of Patent: Jul. 23, 2019

(54) TRANSMISSION DATA SIGNALING IN A WIRELESS COMMUNICATION NETWORK

(71) Applicant: Telefonaktiebolaget LM Ericsson (publ), Stockholm (SE)

(72) Inventors: Reza Moosavi, Linköping (SE); Jung-Fu Cheng, Fremont, CA (US); Erik Eriksson, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/522,190

(22) PCT Filed: Nov. 28, 2014

(86) PCT No.: PCT/SE2014/051418
§ 371 (c)(1),
(2) Date: Apr. 26, 2017

(87) PCT Pub. No.: WO2016/068769
PCT Pub. Date: May 6, 2016

(65) Prior Publication Data
US 2017/0324511 A1 Nov. 9, 2017

Related U.S. Application Data

(60) Provisional application No. 62/073,182, filed on Oct. 31, 2014.

(51) Int. Cl.
*H04L 1/00* (2006.01)
(52) U.S. Cl.
CPC .......... *H04L 1/0046* (2013.01); *H04L 1/0003* (2013.01); *H04L 1/0009* (2013.01); *H04L 1/0038* (2013.01)

(58) Field of Classification Search
CPC .............................. H04L 25/4902; H03K 7/08
See application file for complete search history.

(56) References Cited

U.S. PATENT DOCUMENTS 6,671,326 B1   12/2003  Tortelier
8,681,744 B2 *  3/2014  Haim ................... H04B 1/7105
                                                              370/310

(Continued)

FOREIGN PATENT DOCUMENTS

EP        2 077 646 A1       7/2009

OTHER PUBLICATIONS

Blind Fram Synchronization for Error Correcting Codes Having a Sparse Parity Check MATRIX by Rodriguez Imad et al.; IEEE Transactions on Communications, vol. 57, No. 6—Jun. 2009.
Compression of Associated Signaling for Adaptive Multi-Carrier Systems by Hang Nguyen et al.; Alcatel Research and Innovations, Advanced Mobile Solutions Department—IEEE 2004.
Fast Blind Recognition of Channel Codes by Reza Moosavi and Erik G. Larsson—2014.

(Continued)

*Primary Examiner* — Shuwang Liu
*Assistant Examiner* — Gina M McKie
(74) *Attorney, Agent, or Firm* — Patent Portfolio Builders, PLLC

(57) ABSTRACT

There is disclosed a method for operating a wireless device in a wireless communication network. The method comprises receiving, by the wireless device, of transmission data signals from the wireless communication network, and performing blind detection, by the wireless device, on the transmission data signals. There are also disclosed further related methods and apparatuses.

20 Claims, 12 Drawing Sheets

(56) References Cited

U.S. PATENT DOCUMENTS

| | | | |
|---|---|---|---|
| 2005/0254600 A1* | 11/2005 | Chen | H04L 27/0012 375/324 |
| 2009/0170509 A1* | 7/2009 | Cai | H04L 1/0003 455/434 |
| 2010/0061359 A1* | 3/2010 | Fukuoka | H04J 11/0026 370/342 |
| 2011/0231703 A1* | 9/2011 | Pargellis | G05B 23/0281 714/26 |
| 2012/0219096 A1 | 8/2012 | Larsson et al. | |
| 2012/0250642 A1* | 10/2012 | Qu | H04W 48/12 370/329 |
| 2013/0301583 A1 | 11/2013 | Lundby | |
| 2014/0086063 A1* | 3/2014 | Wu | H04W 24/00 370/241 |
| 2015/0057041 A1* | 2/2015 | Bao | H04W 48/16 455/515 |

OTHER PUBLICATIONS

Fast Blind Recognition of Channel Codes by Reza Moosavi and Erik G. Larsson; Linkoping University Post Print; IEEE Transactions on Communications, Accepted for Publication—IEEE 2013.

Reducing Physical Layer Control Signaling Using Mobile-Assisted Scheduling by Reza Moosavi and Erik G. Larsson; IEEE Transactions on Wireless Communications, vol. 12, No. 1—Jan. 2013.

Resource Allocation and Control Signaling in the Winner Flexible Mac Concept by Mikael Sternad et al.—IEEE 2008.

Robust Automatic Modulation Classification Using Cumulant Features in the Presence of Fading Channels by Songnan Xi et al.; Communications and Signal Processing Laboratory, Department of Electrical and Computer Engineering, Louisiana State University, Baton Rouge, LA—IEEE 2006.

International Search Report for International application No. PCT/SE2014/051418—dated Apr. 2, 2015.

* cited by examiner

TRANSMISSION DATA SIGNALING IN A WIRELESS COMMUNICATION NETWORK

PRIORITY

This nonprovisional application is a U.S. National Stage Filing under 35 U.S.C. § 371 of International Patent Application Serial No. PCT/SE2014/051418 filed Nov. 28, 2014, and entitled "Transmission Data Signaling In A Wireless Communication Network" which claims priority to U.S. Provisional Patent Application No. 62/073,182 filed Oct. 31, 2014, both of which are hereby incorporated by reference in their entirety.

TECHNICAL FIELD

The present disclosure pertains to signaling of transmission data in a wireless communication network.

BACKGROUND

Many state-of-the-art wireless multiple access systems exploit multiuser diversity by adaptively scheduling the channel resources to the users that have strong channel conditions. This opportunistic scheduling in combination with adaptive modulation and coding (AMC) facilitates high throughputs in modern wireless access systems. While the above techniques result in a strong effective channel between the base station and the users, which increases the overall system throughput, they incur signaling overhead on the system. This is so because the users must be informed about the scheduling assignments as well as the transmission parameters prior to the actual payload transmission, since otherwise they do not know where to look for payload data, nor how to decode the incoming data. The transmission of the scheduling assignments and the AMC parameters, referred to as control signaling here after, consumes some part of the channel resources that could otherwise be used for payload transmission, which under many operational conditions may be a significant part of the available resources.

SUMMARY

One of the objects of this disclosure is to provide concepts and embodiments to lower and/or to remove the overhead of control signaling, in particular of and/or for scheduling assignments or data, and/or allow operating with reduced overhead.

Accordingly, there is described a method for operating a wireless device in a wireless communication network. The method comprises receiving, by the wireless device, of transmission data signals from the wireless communication network, and performing blind detection, by the wireless device, on the transmission data signals.

There is also disclosed a method for operating a network node in a wireless communication network, comprising, providing transmission data for a wireless device; and encoding, based on the transmission data, to provide transmission data signals, the encoding being further based on a coding, the coding being one of a set of codings uniquely associated to the wireless device.

Moreover, there is disclosed a method for operating a wireless communication network, the wireless communication being in wireless connection with at least one wireless device, comprising assigning a set of codings to a wireless device, the set of codings being uniquely associated to the wireless device, and providing transmission data for the wireless device, and encoding, based on the transmission data, to provide transmission data signals, the encoding being based on one of the codings in the set of codings.

A wireless device for a wireless communication network may be considered as well. The wireless device comprises reception circuitry adapted for receiving transmission data signals and control circuitry adapted for performing blind detection on the transmission data signals.

Furthermore, a network node for a wireless communication network is described. The network node comprises control circuitry adapted for providing transmission data for a wireless device wirelessly connected or connectable to the network. The control circuitry is adapted for encoding, based on the transmission data, to provide transmission data signals, the encoding being further based on a coding, the coding being one of a set of codings uniquely associated to the wireless device.

A program product including instructions executable by control circuitry is disclosed, the instructions causing the control circuitry to control and/or perform any of the methods described herein when executed by the control circuitry.

There is also disclosed a storage medium storing a program product as disclosed herein and/or instructions executable by control circuitry, the instructions causing the control circuitry to control and/or perform any of the methods as described herein when executed by the control circuitry.

According to the approaches described herein, the amount of signaling overhead for transmitting data, in particular transmission data, e.g. control data like scheduling data, and/or payload data, to a wireless device may be reduced or removed. Instead of transmitting the coding information and/or scheduling information from a network, the wireless device may determine the corresponding information by blind detection.

DETAILED DESCRIPTION

Figure 1:
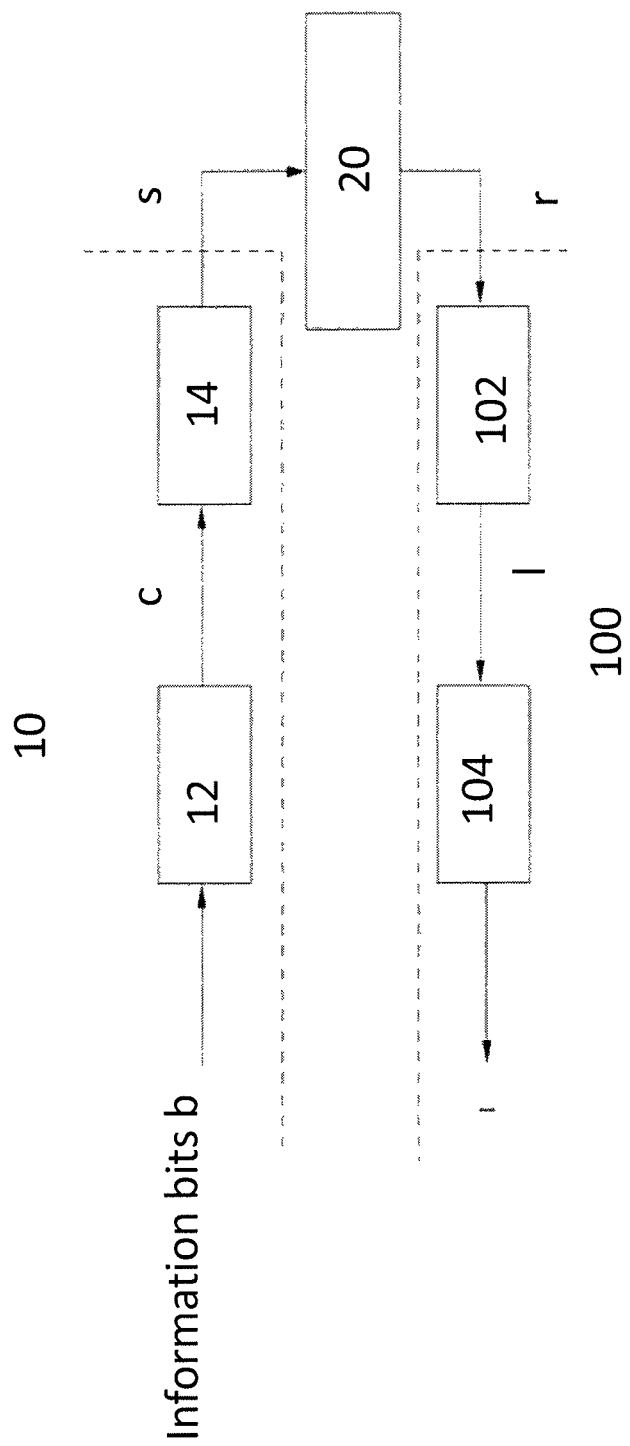
FIG. 1 shows a schematic for a general communication link.

There is disclosed a method for operating a wireless device in a wireless communication network. The method comprises receiving, by the wireless device, of transmission data signals from the wireless communication network. The method further comprises performing blind detection, by the wireless device, on the received transmission data signals. The method may comprise communicating, by the wireless device, based on the blind detection. The communicating may be in and/or with the wireless communication network.

Receiving may be performed by a receiving module of the wireless device, which may be called WD receiving module. Performing blind detection may be performed by a blind detection module of the wireless device, which may be called WD blind detection module. A step of decoding and/or demodulating the transmission data signals based on the blind detection may be envisaged, for example by a decoding and/or demodulating module of the wireless device, which may be referred to as WD decoding module.

The blind detection may be performed based on a set of codings available to the wireless device, which may be uniquely associated to the wireless device.

Generally, a or each coding of the set of codings may comprise a channel code and/or a modulation format.

It may be considered that the wireless device receives an indication of a set of channel codes for blind detection from the wireless communication network. Receiving the indication may be performed by an indication receiving module of the wireless device, which may be called WD indication receiving module. The WD indication receiving module may be comprised in and/or comprise a WD receiving module.

Performing blind detection may comprise determining Adaptive Modulation and Coding (AMC) parameters of the transmission data signals. Determining AMC parameters may be performed by an AMC determining module of the wireless device, which may be called a WD AMC determining module.

Generally, performing blind detection may be based on a syndrome posterior probability (SPP) method. The wireless device may comprise a SPP calculation module, which may be called WD SPP calculation module for calculating a SPP and/or estimating.

There is also disclosed a method for operating a network node in a wireless communication network. The method comprises providing transmission data, e.g. determining scheduling data for a wireless device, e.g. by a scheduling module of the network node. The method also comprises encoding, e.g. by an encoding module, based on the transmission data, to provide transmission data signals. The encoding is further based on a coding, the coding being one of a set of codings uniquely associated to the wireless device. The network node may comprise a transmission data providing module for providing transmission data, which may be implemented as a scheduling module for determining scheduling data and/or as a data receiving module for receiving transmission data in particular like payload data, as described herein, and/or an encoding module for encoding as described herein. The method may comprise transmitting the (encoded) transmission data signals to a wireless device, which may be a wireless device connected or connectable to the wireless communication network, in particular via a cell, which may be provided and/or controlled by the network, e.g. the network node.

A or each coding of the set of codings may comprise a channel code and/or a modulation format.

The method may further comprise assigning the set of codings to the wireless device. The assigning may be performed by the network node and/or an assigning module of the network node.

Moreover, there is disclosed a method for operating a wireless communication network, the wireless communication being in wireless connection with at least one wireless device. The method comprises assigning a set of codings to a wireless device, the set of codings being uniquely associated to the wireless device. The method also comprises providing transmission data, e.g. control data like scheduling data and/or payload data, for the wireless device, and encoding, based on the transmission data, to provide transmission data signals, the encoding being based on one of the codings in the set of codings. Assigning may be performed by a network assigning module, which may be an assigning module of a network node. Providing transmission data may be performed by a transmission data providing module. In particular, determining scheduling data as a form of providing transmission data may be performed by a scheduling module or network scheduling module, which may be implemented as a scheduling module of a network node. The network may comprise at least one network node, in particular any one network node described herein.

A or each coding of the set of codings may comprise a channel code and/or a modulation format.

The method may comprise transmitting the transmission data signals. The network may comprise a network transmitting module for transmitting the transmission data signals. The network transmitting module may comprise and/or be implemented as a transmitting module for transmitting transmission data signals of a network node. A network node may comprise a corresponding transmitting module.

Moreover, the method may comprise receiving, by the at least one wireless device, the transmission data signals. The wireless device may comprise a corresponding receiving module or WD receiving module.

The method may further comprise performing blind detection, by the wireless device, on the transmission data signals.

There is described a wireless device for a wireless communication network, the wireless device being adapted for, and/or comprising reception circuitry adapted for and/or a reception module for, receiving transmission data signals and further being adapted for, and/or comprising control circuitry adapted for and/or a blind detection module for, performing blind detection on the transmission data signals. The reception circuitry may be part of and/or implemented in antenna circuitry and/or radio circuitry and/or control circuitry. The wireless device may be adapted for, and/or comprise a communication module, for operating and/or communicating, in particular performing cellular communication or operation and/or transmission and/or reception, based on the transmission data signals. It may be considered that the wireless device comprises transmitter circuitry for transmission of data to the network and/or a network node. Generally, the wireless device, and/or control circuitry and/or a decoding module of the wireless device, may be adapted for decoding and/or demodulating the transmission data signals based on the blind detection and/or a best coding determined by the blind detection. Additionally or alternatively, the wireless device may be adapted for, and/or comprise a communication module for, communicating based on the blind detection and/or a coding determined by blind detection. The coding may in particular be used for decoding and/or demodulating data signals, in particular signals from the network or a network node providing the transmission data signals, for example by the wireless device and/or a decoding and/or demodulating module of the wireless device, which may be referred to as WD decoding module. It may be considered that communicating comprises decoding and/or demodulating signals based on a coding determined by blind detection.

The wireless device, and/or control circuitry and/or the control module, may be adapted for performing blind detection based on a set of codings uniquely associated to the wireless device.

A or each coding of the set of codings may comprise a channel code and/or a modulation format.

It may be considered that the wireless device, e.g. the reception circuitry and/or the control circuitry, is adapted for receiving an indication of a set of codings for blind detection from the wireless communication network.

The wireless device and/or control circuitry may be adapted for performing blind detection including determining Adaptive Modulation and Coding (AMC) parameters of the transmission data signals. This may be seen as a form of extracting coding information from the transmission data signals.

In one alternative, the wireless device, and/or control circuitry and/or a blind detection module of the wireless device, may be adapted for performing blind detection based on a syndrome posterior probability (SPP) method.

Furthermore, there is disclosed a network node for a wireless communication network, the network node being adapted for, and/or comprising control circuitry, and/or a transmission data providing module, like e.g. a scheduling module, adapted for, providing transmission data for a wireless device, the wireless device being wirelessly connected or connectable to the network node;
the network node and/or control circuitry being adapted for, and/or the network node comprising an encoding module for, encoding, based on the transmission data, to provide transmission data signals, the encoding being further based on a coding, the coding being one of a set of codings uniquely associated to the wireless device.

Generally, the channel codes and/or the codings may be or comprise AMC codes.

The network node may further be adapted for, and/or comprise an assigning module for, assigning the set of channel codes to the wireless device.

There is also disclosed a program product including instructions executable by control circuitry, the instructions causing the control circuitry to control and/or perform any one of the methods of described herein.

Moreover, there is disclosed a storage medium storing a program product as described herein and/or instructions executable by control circuitry, the instructions causing the control circuitry to control and/or perform any one of the methods as described herein executed by the control circuitry.

Transmission data may generally be data intended for transmission and/or data transmitted, in particular to a wireless device. Transmission data may be transmitted, e.g. in the form of transmission data signals. Transmission data may comprise control data, e.g. scheduling data, and/or payload or user data. Control data may generally refer to data for controlling and/or configuring communication and/or a wireless device. Control data may be and/or comprise allocation data and/or scheduling data. Scheduling data may refer to data indicating resource scheduling for a wireless device to be scheduled by a network and/or network node. Payload data may generally refer to user data, e.g. data intended for the operator of a wireless device, and/or web information data, e.g. from a web page, and/or communication data, e.g. voice data and/or SMS/MMS data and/or email data, and/or media data, e.g. video data and/or audio data. It may be considered that payload data is provided to a network node, e.g. a base station or eNodeB, via the network and/or from another wireless device and/or a server, e.g. a web server and/or database server and/or media server. Transmission data may in particular comprise and/or be scheduling data for uplink transmission, in particular cellular uplink transmission, and/or for D2D communication, wherein the scheduling data may pertain in particular to the wireless device it is intended for. It may be generally considered that scheduling data comprises and/or is D2D scheduling information and/or uplink scheduling information. The scheduling data may be such that it does not contain (cellular) downlink scheduling information and/or only contains D2D scheduling information and/or uplink scheduling information. D2D scheduling information may be information indicating resources for D2D communication, in particular transmission and/or reception, in particular for the wireless device the scheduling data is intended for. Uplink scheduling information may be information indicating resources for unlink transmission, in particular cellular uplink transmission, for the wireless device the scheduling data is intended for. Downlink scheduling information, in particular cellular downlink information, may indicate resources on which the wireless device, in particular the wireless device the scheduling data is intended for, is scheduled for receiving data signals from the network, in particular the network node. In this context, downlink scheduling information may be considered explicit information, as opposed to the implicit information that a wireless device is scheduled for reception of data from the network the wireless device may obtain from successful blind detection of data intended for it.

The wireless device may be a user equipment, in particular according to LTE.

The network node may be an eNodeB, in particular according to LTE.

There may be generally envisaged a Syndrome Posterior Probability (SPP) method, which may in particular be calculated and/or applied for one or more channel codes, in particular Linear Channel Codes.

In this context, there may be considered a general communication link, as for example depicted in FIG. 1. The link may be established between or comprise a transmitter 10, e.g. a network node, and a receiver 100, e.g. a wireless device. Information bits b to be transmitted may be provided to and/or by the transmitter, for example via a network, which may be a core network providing a connection to one or more than one other nodes, e.g. network nodes, and/or a second wireless device like a user equipment. The information bits $b=[b_1, \ldots, b_l]$ may be encoded, e.g. in a first encoding step and/or by an encoder 12 of the transmitter, to obtain a sequence of coded bits $c=[c_1, \ldots, c_N]$, (generally N>I). The coded bits c may then be modulated, e.g. by a modulation device 14 of the transmitter, using a modulation scheme, e.g. an AMC scheme, to obtain a sequence of modulated bits or symbols s to be transmitted. It may be considered that the chosen AMC scheme affects the encoding as well, in particular forward error correction, if it is performed by the encoder 12 (it may generally be considered that encoder 12 is for error encoding, e.g. using a CRC approach, and that forward error correction is performed by the modulation device 14 together with modulation). The sequence s may be transmitted via a channel 20, which may comprise one or more physical and/or logical channels and/or utilize time-frequency resources assigned to the link, e.g. by a network node (for example, the transmitter 10 itself) and/or a network. When transported via channel 20, the sequence s may undergo changes, e.g. by interference, signal dampening, noise, etc., and be received by receiver 100 as a received sequence or vector r. Upon reception of the received vector r, a demodulator 102 of the receiver 100 may compute soft information $l=[l_1, \ldots, l_N]$ for the transmitted bits c. The soft information $l_i$ for the ith coded bit $c_i$ may be presented as the posterior log-likelihood ratio (LLR), e.g.

$$l_i = \log\left(\frac{Pr(c_i = 0 \mid r)}{Pr(c_i = 1 \mid r)}\right)$$

holds. For a given channel code with parity check matrix H, the probability that all syndrome checks of the code are satisfied given the received vector r may be determined as:

$$\Gamma \triangleq Pr\left(\bigoplus_j c_{h_{ij}} = 0, \forall\, i = 1, 2, \ldots, N-l \mid r\right) = \prod_{i=1}^{N-l} Pr\left(\bigoplus_j c_{h_{ij}} = 0 \mid r\right),$$

where $h_{ij}$ is the index of the jth nonzero element of the ith row of the parity check matrix H, which may generally be considered as a matrix defining (linear) correlations that a codeword (the information bits after encoding (e.g. error detection and forward error correction)) has to satisfy. Herein, in the last step it is assumed that the syndrome checks corresponding to different rows of the parity check matrix are independent, which is justifiable for long observation sequences and/or for channel codes with sparse parity check matrices. The LLR $\gamma_i$ associated with the ith syndrome check of the code is given by $$\gamma_i = \log\left(\frac{Pr(\bigoplus_j c_{h_{ij}} = 0 \mid r)}{1 - Pr(\bigoplus_j c_{h_{ij}} = 0 \mid r)}\right) = \boxplus\, l_{h_{ij}}$$

where $\boxplus$ denotes the box-plus operation. The box-plus operation is defined as $$l_1 \boxplus l_2 = \log\left(\frac{1 + \tanh(l_1/2)\tanh(l_2/2)}{1 - \tanh(l_1/2)\tanh(l_2/2)}\right),$$

with $\boxplus \infty = 1$, $1 \boxplus -\infty = -1$, and $1 \boxplus 0 = 0$.

Combining these two and taking the logarithm, the syndrome posterior probability (SPP) for the code is given by $$\log(\Gamma) = \sum_{i=1}^{N-l} \log\left(\frac{e^{\gamma_i}}{1 + e^{\gamma_i}}\right) = -\sum_{i=1}^{N-l} \log(1 + e^{-\gamma_i}).$$

$\Gamma$ may be called the syndrome posterior probability (SPP) of the code. Note that the SPP is found blindly, i.e., it is not necessary to decode the bits in order to find the SPP for the code. Note also that in scenarios where the receiver is interested in blindly detecting which channel code out of e.g. M possible candidate codes was used by the transmitter, a detection strategy may be to compute the SPP for each candidate code and pick the one that yields the maximum SPP. It is worth noting that the box-plus and/or the above equations may be approximated for faster and more efficient implementation of the SPP. Thus, there are multiple possible implementations of a SPP method, which may generally comprise determining a best coding out of a set of codings, wherein the best coding may have the highest or maximum SPP out of the set of coding, wherein the SPP for each coding may be calculated and/or estimated, e.g. based on the method described herein. Calculating and/or estimating may be performed without and/or before decoding of and/or based on a received vector r; it may be considered that decoding is performed with and/or based on the best coding.

Herein, a scheme for blind detection of scheduling assignments in scheduling dataA signals is presented. According to the scheme, no signaling overhead is required for the transmission of the scheduling assignments.

Generally, an idea to hide user-specific features (e.g. a user-specific coding or a coding unique to a wireless device) in transmission data signals, e.g. scheduling data signals like scheduling blocks and/or payload data signals is disclosed, such that for example for each resource block combination of data, e.g. a scheduling block, only the user or wireless device that is scheduled on that block or block combination identifies that the data is intended for itself. The user-specific features can in general include variety of features. However, since the proposed scheme comprises blind detection attempts by the users or wireless devices, the computational complexity burden is mostly on the users or wireless devices. Hence, it is desirable to exploit some features such that they provide good distinction between different users or different wireless device but require low computational complexity. One such feature, namely to exploit user-specific channel codes or uniquely associated codings is described in more detail herein. Exploiting this feature, the users or wireless devices may not only identify data intended for itself without receiving explicit scheduling information, but they also may determine the AMC parameters used for the transmission. Therefore, the proposed scheme may avoid the need for signaling overhead concerning the transmission of scheduling assignments as well as coding information, e.g. AMC parameters, in particular for payload data. In the case scheduling data is being provided, e.g. for scheduling uplink transmissions, the overhead to provide coding information may be avoided. There are also proposed some different schemes for implementation of the general idea.

There may be considered a system with at least one network node, to which K users are connected, wherein each user represents a wireless device, and $N_s$ represents transmitted data signals or corresponding resources like data or resource blocks, on which transmission data signals are transmitted. Once a network node determines scheduling decisions, instead of explicitly transmitting the scheduling assignments (scheduling data) with explicitly indicating which resource or block is assigned to or intended for which wireless device before transmitting the transmission data signals, user-specific channel codes respectively uniquely associated codings may be used such that only the scheduled users are able to recognize the codings and/or channel codes and consequently the resource assignments. Hence, no additional signaling overhead is required. It may be assumed that the set of codings or channel codes that the base station or network node can pick for and/or use for decoding and/or demodulation of the transmission of data, in particular scheduling data and/or payload data, for a user k is limited to the set $S_k$. Let $M_k$ denote the cardinality of this set, i.e., the number of possible channel codes that can be used for user k. Note that the sets $\{S_k\}_{k=1}^{K}$ need not to have the same cardinality (in other words, $M_k$ may be different for different users). This is especially useful, since it allows different number of blind attempts for different users, which can be exploited when designing the system. That is, for users with higher computational complexity power, one may choose larger number of possible channel codes or codings that they should monitor and vice versa. Also, note that the sets corresponding to different users may need to comprise of distinct codings or channel codes. However, this does not mean that different types of codings or channel codes or channel encoders/decoders for different users are required. Each channel code may be part of a coding and/or represent a coding.

In one variant, the codings, in particular channel codes, may be obtained from the same M base channel codes but scrambled/interleaved with user (wireless device) specific scrambling/interleaving sequences, which results almost surely in distinct codings or channel codes, at least whenever K is small. Whenever there are many users (i.e., whenever K is large), the use of some of the channel codes may be restricted to accommodate all the users.

Additionally or alternatively, the user-specific channel codes or uniquely associated codings may be selected from a family of parameterized codes based on user-specific parameters. As nonlimiting exemplary implementations, a turbo code family for a block length can be formed by having multiple QPP (quadratic permutation polynomial) interleavers for the same block length. A LDPC (low density parity check) code family for a block length can be formed by having multiple parity check matrices for the same block length, where each of the matrices is parameterized with different cyclic shift parameters for the component matrices in the parity check matrix. Thus, different channel codes may be implemented. It may be considered to ensure that the different channel codes and/or codings or set of codings are sufficiently orthogonal to each other to allow the wireless devices to distinguish the codings.

Figure 2:
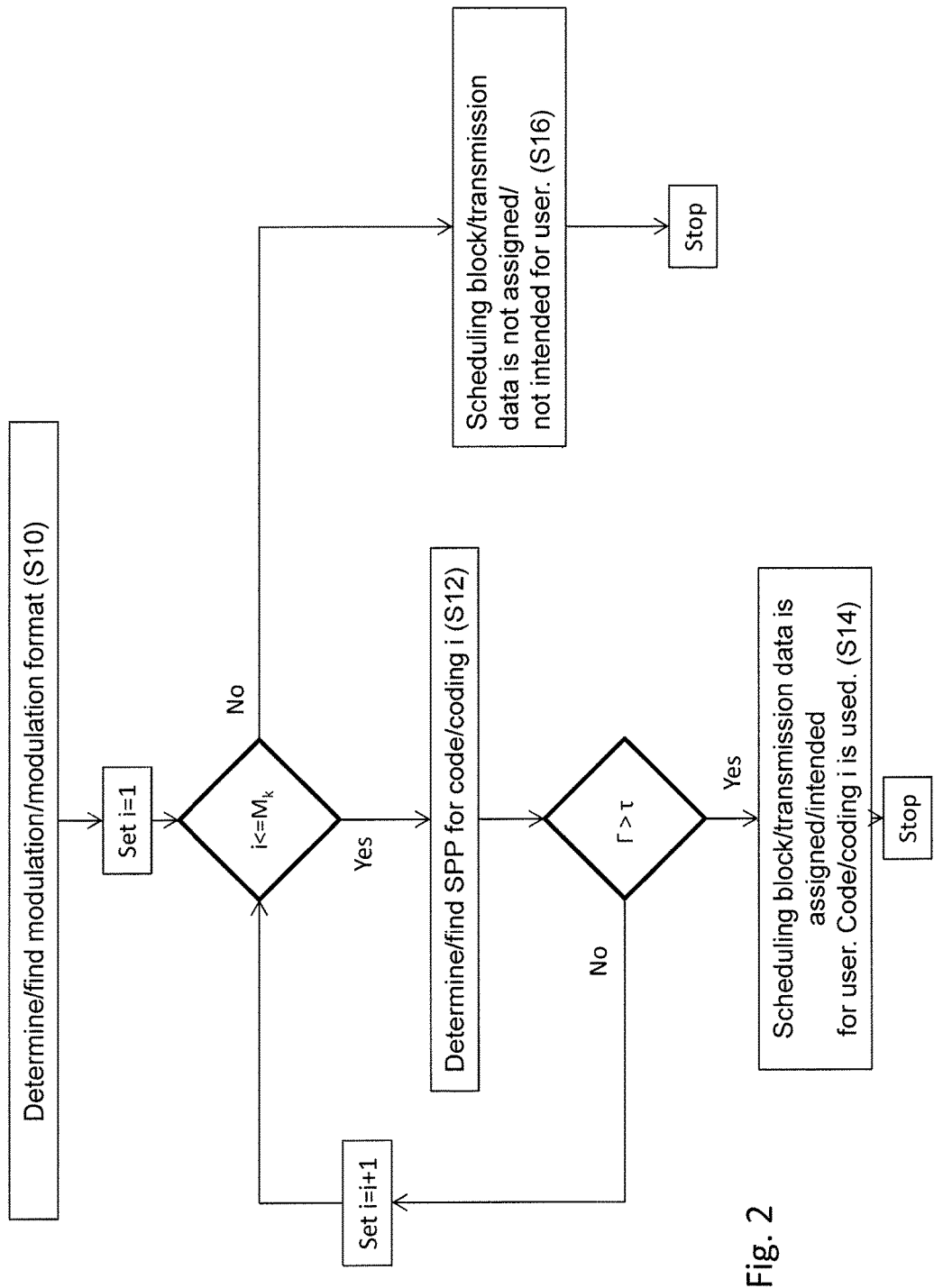
FIG. 2 shows an algorithm for performing blind detection.
Figure 3:
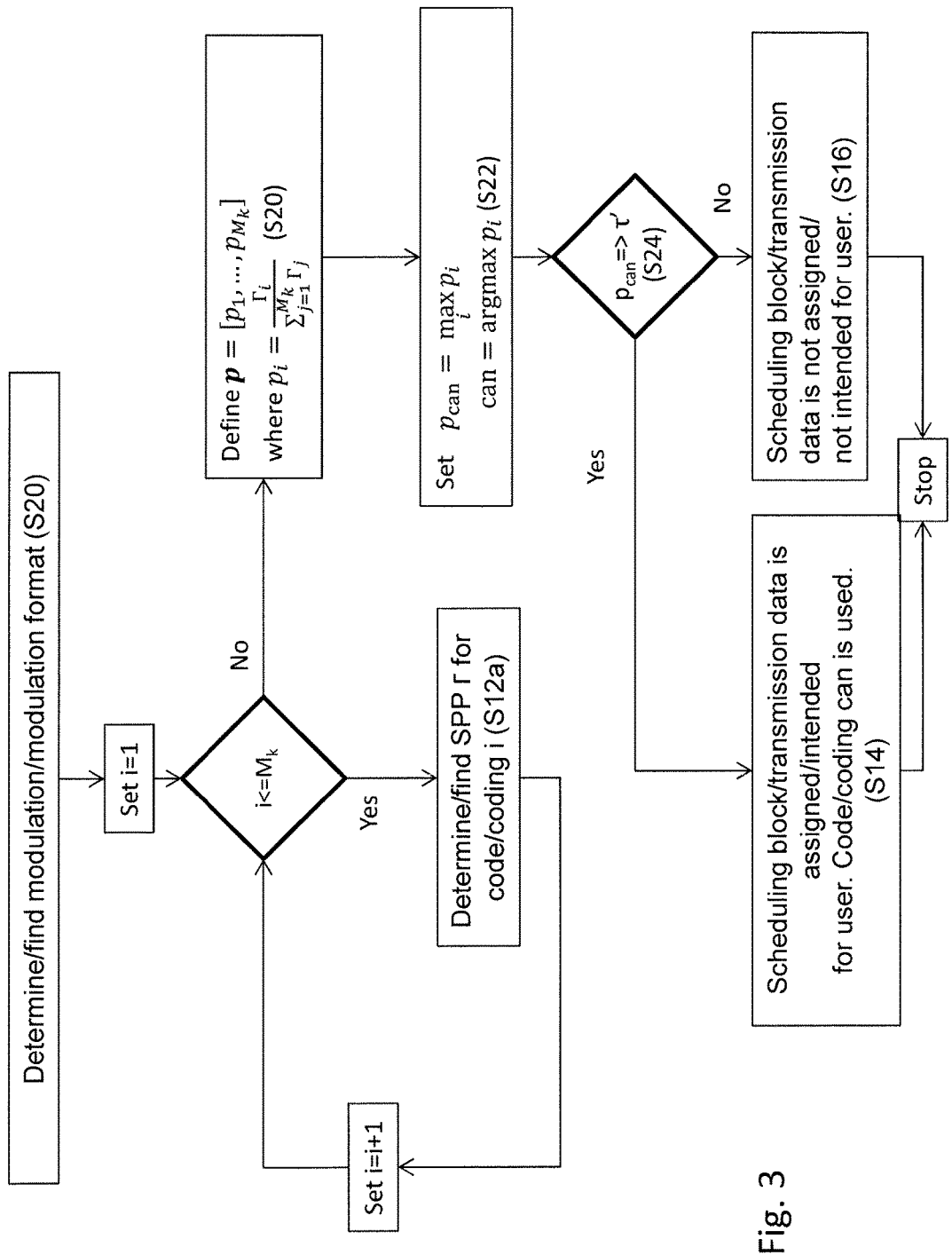
FIG. 3 shows a further algorithm for performing blind detection.

The users or wireless device, upon reception of channel symbols (e.g. transmission data signals like scheduling data signals and/or payload data signals) corresponding to each scheduling block, perform, as blind detection, a hypothesis testing to determine whether they are scheduled on that scheduling block or not. The hypothesis test for a specific user, say user k, may be to determine if one of the channel codes from its candidate set $S_k$ is used to encode the data or not. In case that the user gets a hit for one of the codes, it assumes that the scheduling block is assigned to it, otherwise it assumes that the scheduling block is assigned to another user. There are different ways how the hypothesis testing or can be implemented. FIGS. 2 and 3 illustrate two example algorithms for user k performed after receiving transmission data signals like scheduling data signals and/or payload signals for blind detection. These algorithms may be performed by control circuitry of a wireless device and/or a corresponding blind detection module.

According to the test in FIG. 2, user k may perform an action S10 to determine the modulation used for the transmission data signals received.

A counter i is set to 1 to indicate the first channel code in the set of codings uniquely associated to the user k, which also may be called candidate set $S_k$. If the index is smaller or equal to the total number of codings in the set of codings associated to the wireless device, the SPP for that code is calculated (S12). If the SPP is above a certain threshold τ, then it is assumed that the scheduling block is assigned to the wireless device and that the first channel code is used to encode the data (S14). If, on the other hand, the SPP Γ is below the threshold τ, then the user will check for the next channel code (setting i=i+1) in the candidate set $S_k$ and follows the same. This procedure is repeated until the SPP of a channel code candidate is above the threshold or all the channel codes in the candidate set are exhausted. If none of the SPP Γ for the $M_k$ candidate channel codes are greater than the threshold τ, then the user assumes that the scheduling block is not assigned to it (S16). It should be noted that in the example it has been assumed that the same modulation is used for all the codings, such that the codings only differ in the channel code used. However, it may be considered that the codings have differing modulation. In such a case, action S10 may be integrated into the loop between surrounding S12 and/or into S12, and for example may be performed together with S12 for each coding i. Moreover, in this example it has been assumed that the threshold τ and the codings have been chosen such that only the coding used will result in a SPP larger than the threshold. In other variants, there may generally be determined the coding with the largest SPP (which may still have to be larger than a threshold). This may e.g. be achieved by starting with a pre-determined minimum threshold and to set a new threshold to the SPP of the current coding, if the threshold has been reached. Thus, the coding with the maximum SPP may be determined.

According to the second test illustrated in FIG. 3, user k determines the modulation in an action S10, for which the disclosure regarding FIG. 2 holds (in particular, depending on the modulation used, it may be performed once or within the loop of determining SPP for each coding i). In this approach, the user first determines the SPP Γ for all the $M_k$ candidate channel codes, by running a loop for all i<=$M_k$, $M_k$ being the number of codings or channel codes associated to user k (S12a). Then a probability vector p=[$p_1, \ldots, p_{M_k}$] over the candidate set $S_k$, is introduced (S20), where $$p_i = \frac{\Gamma_i}{\sum_{j=1}^{M_k} \Gamma_j}$$

represents the probability that the ith candidate code is used to encode the data. Then the channel code that achieves the largest $p_i$ is chosen as the final candidate code can (S22). In S24, the corresponding probability for the final candidate code, i.e., the largest $p_i$, is compared with a threshold τ' to decide whether the scheduling block is assigned to the user or not. If it is larger than the threshold, in S14 similar to the variant shown in FIG. 2, it is determined that the transmission data signal is intended for the user, and the coding with channel code i is used for decoding and/or demodulation, If the largest $p_i$ is not larger than the threshold, is branched to S16 and determined that the transmission data signals received are not intended for the user.

Note that the performance of the hypothesis tests in FIGS. 2 and 3 may depend on the values chosen for the thresholds τ and τ', respectively. However, since the value of the SPP for a given code depends on the operating conditions (for instance how much the signal-to-noise ratio (SNR) is), the hypothesis test in FIG. 2 depends on the operating conditions too. For instance, when SNR is low (i.e., the propagation channel is very erroneous) the SPP for coding used will be small, too. However, compared to the SPP for other code candidates this value is large. Accordingly, the threshold value in the variant of FIG. 2 may be dependent on signaling conditions, in particular on a SNR for signals received from the network node, in particular for transmission data signals. In the test according to FIG. 3 the SPP values are in contrast normalized, removing the dependency on SNR.

It may be considered in some variants that the receiver (the user or wireless device) and/or a WD blind detection module is adapted for only computing the most likely AMC parameters using the proposed SPP scheme (choosing a subset based e.g. on operation or signaling conditions), and decodes according to the determined subset.

A CRC-check on the encoded data may then optionally be used to validate correct decoding. If the CRC checks and the decoding were successful, the receiver may assume the data to be addressed to it. This method is more computationally heavy but has lower misdetection probability, since the decoding is only done for one AMC parameter set. This does not impose any further hardware requirements on the receiver or wireless device.

In some embodiments, the proposed scheme may be combined with a hybrid ARQ protocol allowing retransmissions of non-decoded data. In some embodiments, there may be separate Sk for new data and retransmitted data. In some embodiments, the channel code candidate set may be switched from one set to another to indicate new data. In some embodiments, a HARQ feedback channel may be designed to carry not only the information of failed decoding but also the information of what channel code the decoding was attempted for.

In some embodiments, a network node may be adapted for signaling receiver parameters and/or transmit blind detection parameters to one or more wireless devices, in particular parameters for setting one or more detection thresholds (e.g. a minimum probability threshold like τ or τ' of FIG. 2 or 3). The wireless device may be adapted for, and/or comprise a configuration module for, configuring blind detection based on blind detection parameters received from the network, in particular from the network node transmitting transmission data signals.

The network node may be adapted for determining the blind detection parameters to be transmitted, e.g. based on operating or signaling conditions. The signaling may in some embodiments comprise transmitting of a threshold controlling the number of syndrome checks (or equivalently N) to be done for each candidate in $M_k$ before determining that no scheduling was detected and/or that the transmission data signals are not intended for the wireless device. In some embodiments, the thresholds may be dependent on operating or signaling conditions like the number of wireless devices or users connected to the network node and/or the channel quality for one or more than one of these wireless devices and/or related SNR for transmitting and/or receiving. The thresholds may be determined to be different for different users or wireless devices.

Figure 4:
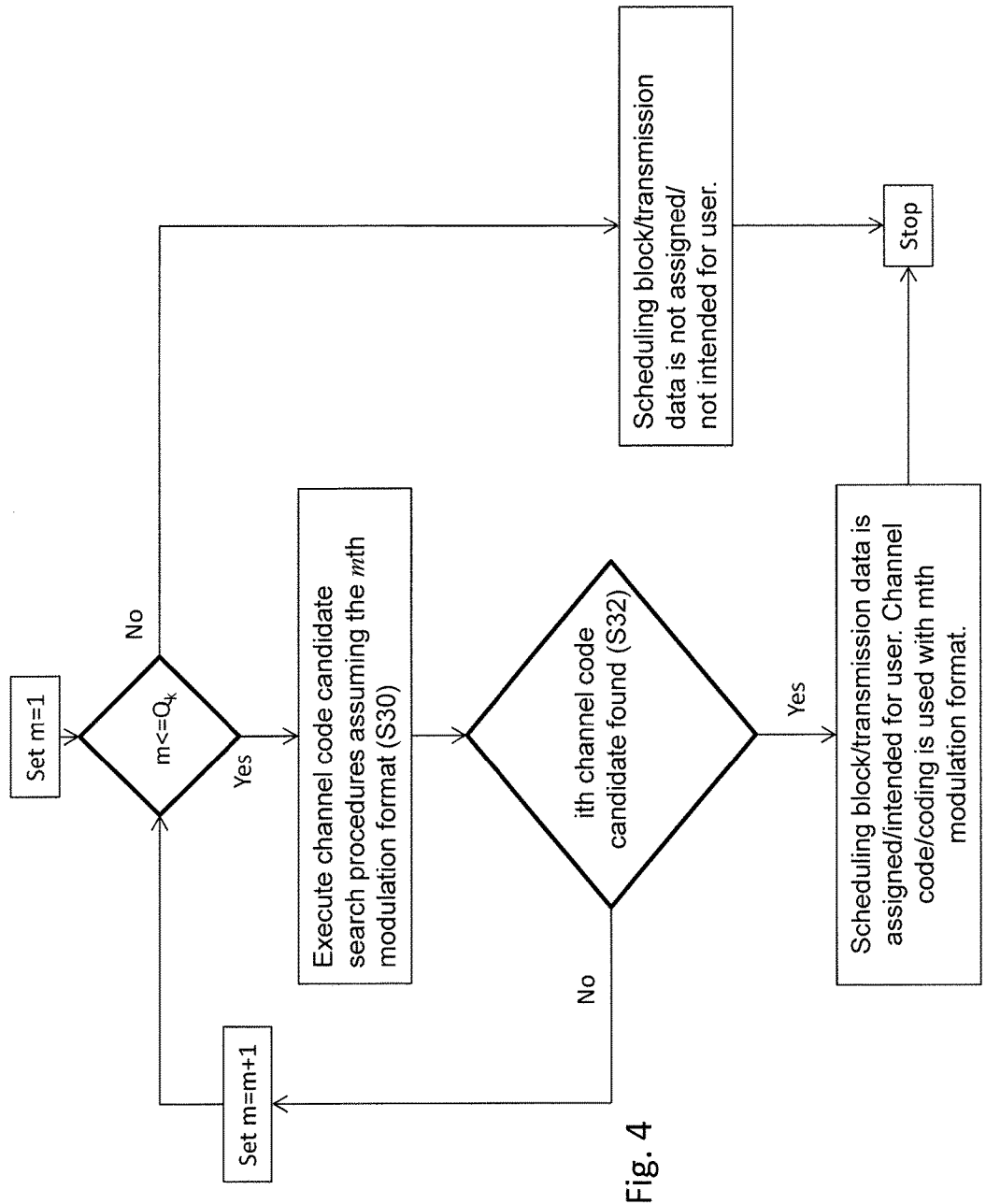
FIG. 4 shows another algorithm for performing blind detection.

There may be envisioned a variant performing blind detection comprising joint modulation and channel code candidate search, e.g. if the codings of the set of codings have different modulations. A nonlimiting procedure is illustrated in FIG. 4 and described herein. The user k takes a first modulation format and/or modulation assumption from the possible modulation format set $Q_k$ available to it ($Q_k$ may be seen as a subset of the set of codings only comprising the possible modulations). This modulation format assumption is then used in a channel code candidate detection algorithm S30, e.g. an algorithm described above referring to FIG. 2 or FIG. 3. In particular, S30 may comprise running the loop around and including S12 with decision blocks S14 and S16 or S12a with S20, S22, S24 and S14 and S16 described above. If a channel code candidate i is found, the user assumes that the scheduling block is assigned to it with the mth modulation format and the ith channel code. If no channel code candidate is found, a next modulation format (setting m=m+1) is selected as the input of the channel code candidate search procedure. The procedures are repeated until a joint modulation format and channel code candidate are found or all modulation format and channel code candidates are tested.

Figure 5:
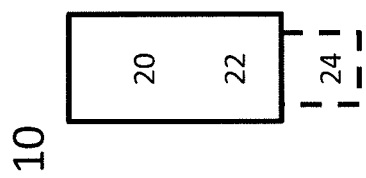
FIG. 5 schematically shows a wireless device.

FIG. 5 schematically shows a wireless device or user equipment 10, which may also be referred to as user. Wireless device 10 comprises control circuitry 20, which may comprise a controller connected to a memory. A receiving module and/or transmission module and/or configuring and/or determining module may be implemented in the control circuitry 20, in particular as module in the controller. The wireless device 10 also comprises radio circuitry 22 providing receiving and transmitting or transceiving functionality, the radio circuitry 22 connected or connectable to the control circuitry 20. In particular, the radio circuitry 22 may comprise or be part of receiver circuitry. An antenna circuitry 24 of the wireless device 10 is connected or connectable to the radio circuitry 22 to collect or send and/or amplify signals. Radio circuitry 22 and the control circuitry 20 controlling it are configured for receiving transmission data signals, in particular utilizing E-UTRAN/LTE resources. Generally, any module of the wireless device 10 may be implemented in the control circuitry 20 and/or radio circuitry 22 and/or antenna circuitry 24, in hardware and/or software and/or firmware.

Figure 6:
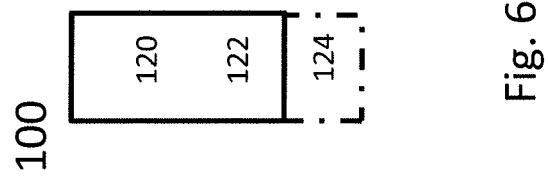
FIG. 6 schematically shows a network node.

FIG. 6 schematically shows a network node or base station 100, which in particular may be an eNodeB. Base station or network node 100 comprises control circuitry 120, which may comprise a controller connected to a memory. The control circuitry 120 is connected to radio circuitry 122 of the network node or base station 100, which provides receiver and transmitter and/or transceiver functionality. An antenna circuitry 124 may be connected or connectable to radio circuitry 122 to provide good signal reception or transmittance and/or amplification. Generally, any module of the network node 100 may be implemented in the control circuitry 120 and/or radio circuitry 122 and/or antenna circuitry 124, in hardware and/or software and/or firmware.

Figure 7:
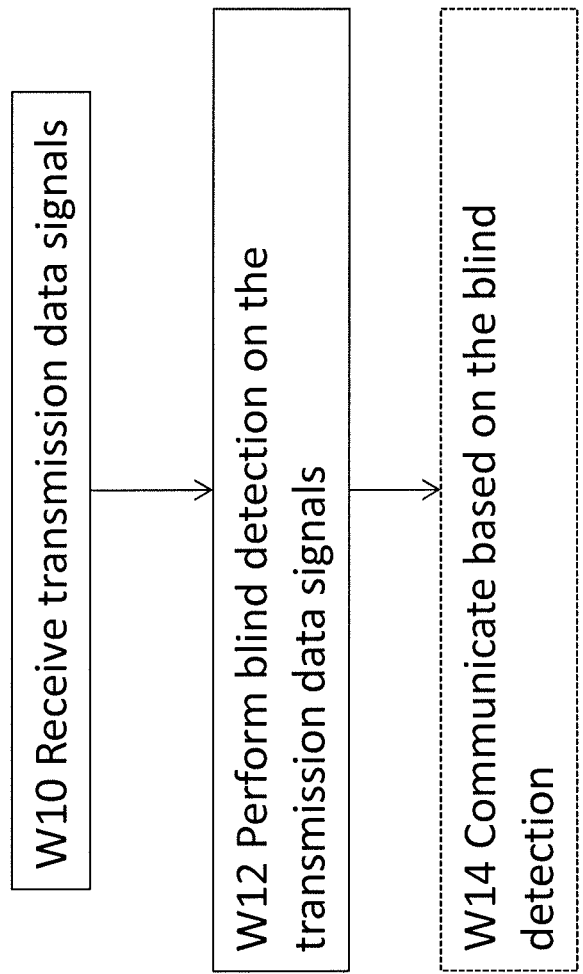
FIG. 7 shows a method for operating a wireless device.

FIG. 7 shows an example of a method for operation a wireless device, which may be a wireless device 10 as described herein. The method comprises a step W10 of receiving, by the wireless device, of transmission data signals from the wireless communication network. The method further comprises a step W12 of performing blind detection, by the wireless device, on the transmission data signals, in particular to determine a coding used for the transmission data signals and/or to determine whether the transmission data signals are intended for the wireless device. The blind detection may e.g. be performed as described in regards to FIG. 2, 3 or 4. Optionally, the method may comprise a step W14 of communicating based on the blind detection and/or the coding determined by the blind detection. The transmission data signals in this case may in particular be control data signals like scheduling data signals and/or payload data signals.

Figure 8:
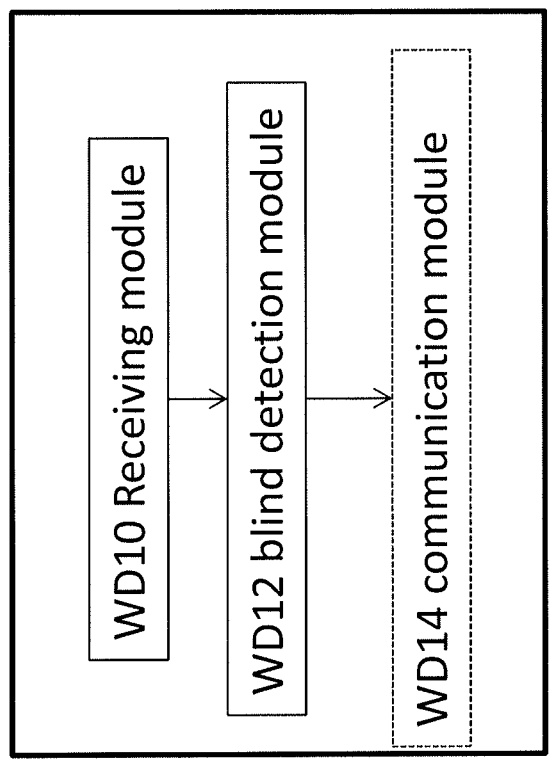
FIG. 8 schematically shows a wireless device.

FIG. 8 shows an example of a wireless device for or of a wireless communication network, which may be a wireless device 10 as described herein. The wireless device comprises a receiving module WD10 for receiving, by the wireless device, of transmission data signals from the wireless communication network, in particular control data signals like scheduling data signals and/or payload data signals. Furthermore, the wireless device comprises a blind detection module WD12 for performing blind detection, by the wireless device, on the transmission data signals, in particular to determine a coding used for the transmission data signals and/or to determine whether the transmission data signals are intended for the wireless device. The blind detection may e.g. be performed as described in regards to FIG. 2, 3 or 4. Optionally, the wireless device may comprise a communication module WD14 for communicating based on the blind detection and/or the coding determined by the blind detection.

Figure 9:
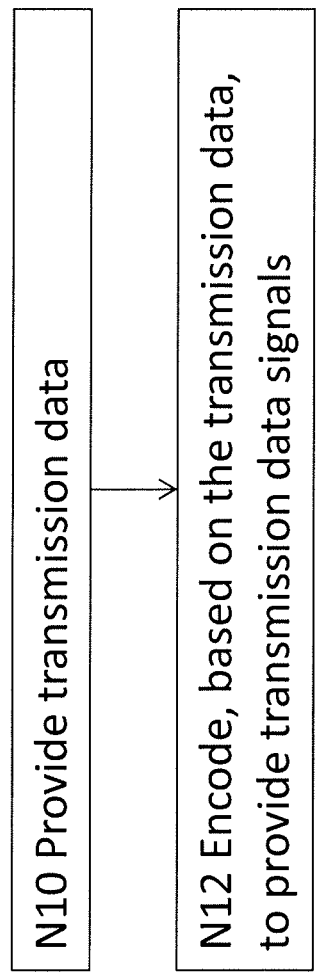
FIG. 9 shows a method for operating a network node.

FIG. 9 shows an example of a method for operating a network node in a wireless communication network. The network node may be a network node or base station 100 as described herein. The method may comprise a step N10 of providing or determining transmission data for a wireless device, which may be a wireless device in communicative connection with the network node and/or to which resources are to be scheduled. The method further comprises a step N12 of encoding, based on the transmission data, to provide transmission data signals, wherein the encoding further is based on a coding, the coding being one of a set of codings uniquely associated to the wireless device. There may be a step N14 (not shown) of transmitting the transmission data signals to the wireless device.

Figure 10:
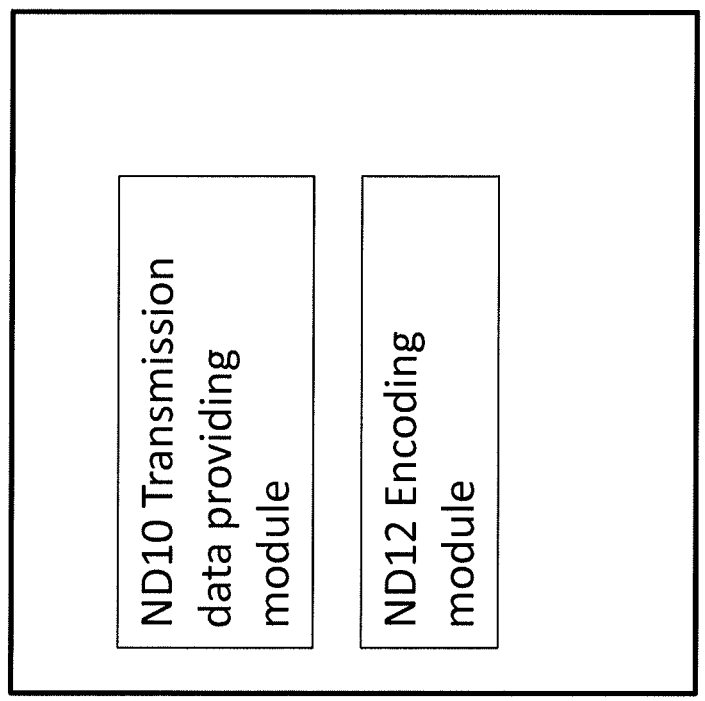
FIG. 10 schematically shows a network node.

FIG. 10 shows an example of a network node for or of a wireless communication network. The network node may be a network node or base station 100 as described herein. The network node comprises a transmission data providing module, which may be a scheduling module or a determining module, ND10 for providing or determining transmission data for a wireless device, which may be a wireless device in communicative connection with the network node and/or to which resources are to be scheduled. The network node further comprises an encoding module ND12 for encoding, based on the transmission data, to provide transmission data signals, wherein the encoding further is based on a coding, the coding being one of a set of codings uniquely associated to the wireless device. There may be a transmitting module ND14 (not shown) for transmitting the transmission data signals to the wireless device. The transmission data in this context may in particular be control data like scheduling data and/or payload data.

Figure 11:
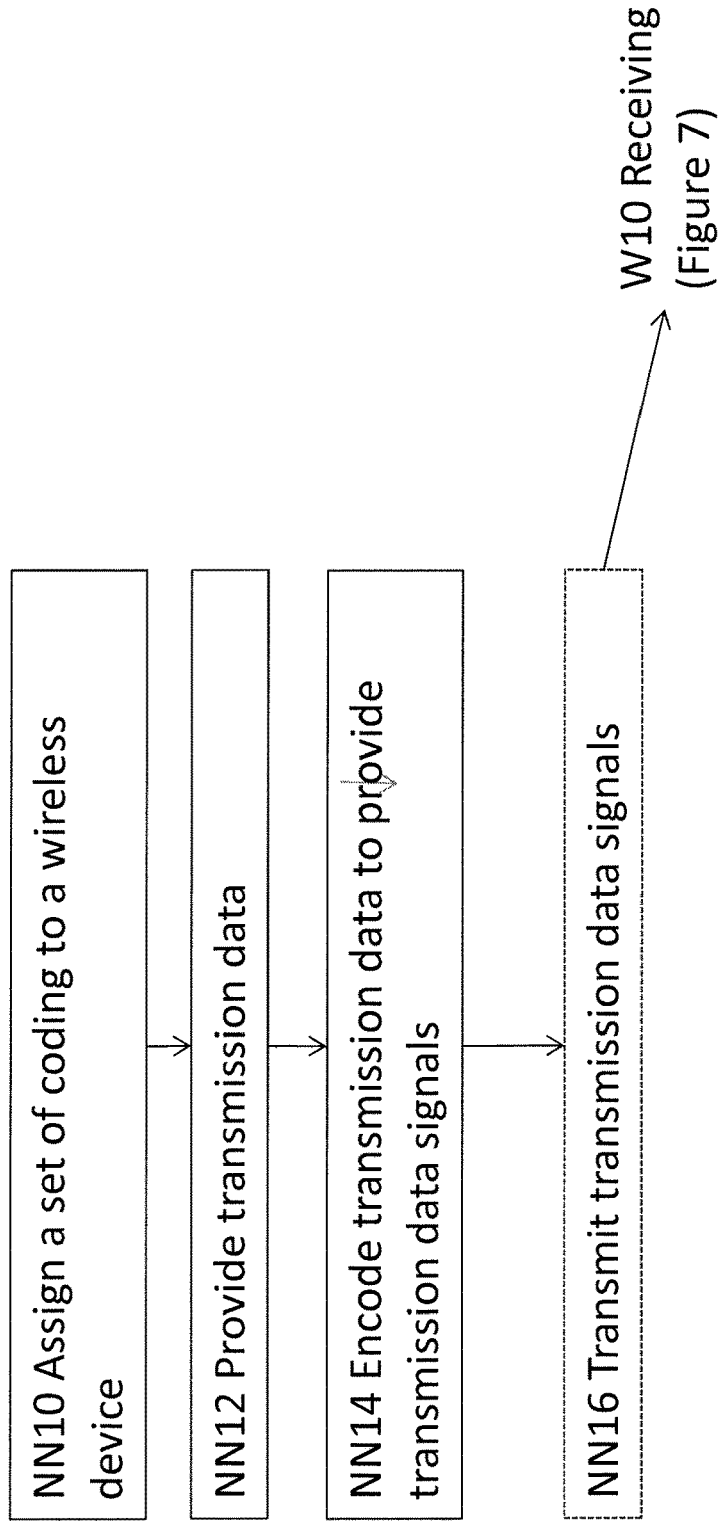
FIG. 11 shows a method for operating a wireless communication network.

FIG. 11 shows a method for operating a network, which may comprise a network node and a wireless device and/or which may be in connection or communication with one or more wireless devices. which may be wireless device 10 and/or as shown in FIG. 8. The method may comprise a step NN10 of assigning a set of codings to at least one wireless device, the set of codings being uniquely associated to the wireless device, and/or such that to each wireless device there is assigned a set of coding uniquely associated to it. The method also comprises a step NN12 of providing or determining transmission data for the wireless device and a step NN14 of encoding, based on the transmission data, to provide transmission data signals, the encoding being based on one of the codings in the set of codings. In an optional step NN16 the network may transmit the transmission data signals to the at least one wireless device, which may perform a method as described in the context of and shown in FIG. 7. The transmission data in this context may in particular be control data like scheduling data and/or payload data.

Figure 12:
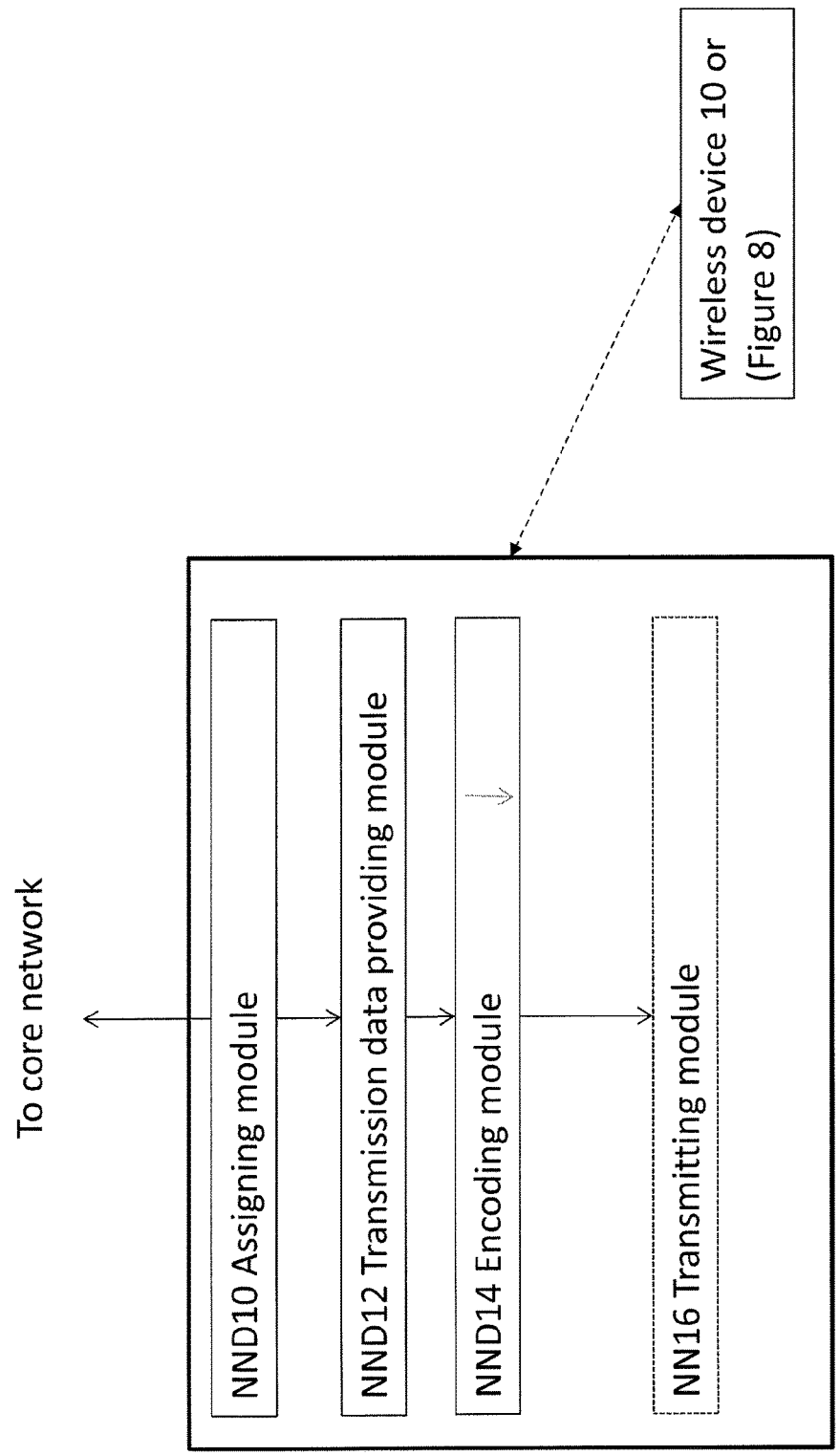
FIG. 12 schematically shows a wireless communication network.

FIG. 12 shows a network, which may comprise a network node and a wireless device and/or which may be in connection or communication with one or more wireless devices, which may be wireless device 10 and/or as shown in FIG. 8. The network comprises an assigning module NND10 for assigning a set of codings to at least one wireless device, the set of codings being uniquely associated to the wireless device, and/or such that to each wireless device there is assigned a set of coding uniquely associated to it. The network also comprises a transmission data providing module, which may be a determining module or scheduling module, NND12 for providing or determining transmission data for the wireless device, as well as and an encoding module NND 14 for encoding, based on the transmission data, to provide transmission data signals, the encoding being based on one of the codings in the set of codings. The network may comprise a transmitting module NND16 for transmitting the transmission data signals to the at least one wireless device, which may be a wireless device 10 or as described in the context of and shown in FIG. 8. The modules of the network may be distributed or distributable over one or more than one hardware entities or devices, or they may be implemented on one device, e.g. a network node. The network generally may comprise or represent a radio access network or air interface, in particular according to LTE/E-UTRAN. It may be considered that the network comprises and/or is connected to a core network, which may comprise higher level functionality, e.g. connection to other radio access networks and/or land-line devices, and/or control functionality and/or billing. The transmission data in this context may in particular be control data like scheduling data and/or payload data.

There are proposed approaches for using blind detection of scheduling assignments by wireless devices. These remove the signaling overhead concerning the transmission of scheduling assignments. Moreover, the algorithm suggested has low computational complexity.

The wireless device may generally be connected or connectable to and/or for communication with the wireless communication network and/or at least one network node, in particular for cellular and/or wireless communication and/or connection. The network node may generally be connected and/or connectable to and/or for communication with the wireless device, in particular for cellular and/or wireless communication and/or connection.

It may be considered that a wireless device generally is adapted for performing any one of the methods for operating a wireless device as described herein. There may generally be considered a network node adapted for performing any one of the methods for operating a network node as described herein.

Generally, transmission data signals, in particular control data signals like scheduling data signals and/or payload data signals, may be signals provided and/or transmitted by a network, in particular a network node, to and/or for a wireless device. Transmission data signals, in particular control data signals like scheduling data signals and/or payload data signals, may be intended for a specific wireless device, which may be in connection or connectable to the network or network node. The wireless device may be in communication with and/or connected to the network or network node, in particular via at least one cell of a wireless or cellular communication network, wherein the cell may be provided by the network, in particular the network node. Scheduling data signals may generally comprise and/or pertain to scheduling and/or resource allocation information for the wireless device, regarding at least one cell. Control data in general, in particular scheduling or resource allocation information or data, may in particular pertain to the cell via which the scheduling data signals are transmitted; it may be considered that they alternatively or additionally pertain to another cell, in particular in the context of multiple connectivity or carrier aggregation. Data signals, like e.g. transmission data signals, may be considered to be data, like e.g. transmission data in particular scheduling data and/or payload data, which is or has been encoded and/or modulated using a coding, e.g. by a transmitter like a network node. Specifically, scheduling data signals may be considered to be scheduling data encoded and/or modulated using a coding, e.g. by a transmitter like a network node. Analogously, control data signals or payload data signals, respectively, may be considered to be control data or payload data, respectively, which has been or is encoded and/or modulated using a coding, e.g. by a transmitter like a network node. Transmission data signals, in particular scheduling data signals and/or payload data signals, transmitted may be subject to changes during their travel to a receiver, e.g. due to damping and interference, such that there may be differences between transmitted and received signals; this is one reason for the use of error detection and/or error correction encoding. Transmission data signals, in particular scheduling data signals and/or payload data signals, may be organized in pre-determined time/frequency resources and/or data blocks, e.g. scheduling blocks for scheduling data signals. A scheduling block may comprise e.g. 2 resource blocks according to an LTE standard. Payload data may be organized in one or more than one resource blocks, depending on the amount of data to be transmitted and the resources available.

Providing transmission data may comprise receiving and/or determining transmission data. Providing control data may comprise determining control data, e.g. by the network node, for example based on operation and/or communication conditions, which may pertain to the signaling or channel quality for communication between the wireless device and the network and/or network node. In particular, determining scheduling data as form of providing, in particular determining, transmission data may comprise scheduling and/or allocating resources, in particular time/frequency resources for cellular communication via at least one cell or carrier provided by the network or a network node, for one or more wireless devices. The scheduling data for a wireless device may represent the resources scheduled for the wireless device and/or allocation data pertaining to the wireless device and/or corresponding information or scheduling information like scheduling assignments. Scheduling data signals may represent encoded and/or modulated scheduling assignments, which may be based on such data or information, provided by scheduling and/or determining scheduling data. It may be considered that determining control data like scheduling data, by a network node and/or a scheduling module, comprises receiving corresponding data from a network and/or another network node, e.g. from a higher layer node and/or a macro node, e.g. if the network node is implemented as a micro node or low power node in a heterogeneous network. In this case, the control functionality, e.g. scheduling of resources, may be performed by another node, which may transmit the corresponding data to the network node, which may determine it by receiving the data and/or based on the received data. Generally, receiving transmission data, in particular payload data, may comprise receiving data from or via the network, e.g. a core network, which may e.g. relay data from another wireless device and/or a given network address like a server (web server, media server, etc.) as transmission data, in particular payload data.

Transmission data signals, in particular control data signals like scheduling data signals, and/or payload data signals, may be considered to be intended for a wireless device in particular if the transmission data or scheduling or payload data they are based on comprises data, e.g. scheduling information and/or allocation data and/or payload or user data, for the wireless device.

A wireless device receiving transmission data signals from a wireless communication network may receive the signals from a network node of the network, in particular a base station or eNodeB. A wireless device may be considered to be in connection and/or communication with a network or network node if it is configured to receive transmission data signals, in particular control data signals and/or scheduling data signals, from the network or network node, e.g. if it is registered in and/or being served by a cell.

A coding may generally comprise a channel code and/or a modulation. A channel code of a coding may generally comprise a forward error correction code and/or be a convolutional or block code. A modulation format may for example comprise a QPSK (quadrature phase-shift keying) modulation format or a QAM (quadrature amplitude modulation) format, which may comprise different modulation parameters. Different codings may comprise different channel codes, in particular different types of channel codes, and/or different modulations. Channel codes may e.g. be considered to be different if they are of different type and/or have different characteristics, in particular parity matrix checks. A coding may be considered an AMC coding if it is used for Adaptive Modulation and Coding. On transmitter side, a coding may be used, e.g. by a network node, for encoding and/or modulating transmission data into transmission data signals and/or other control or user data into corresponding data signals. On receiver side, a coding may be used, e.g. by a wireless device like a user equipment, for decoding and/or demodulating transmission data signals into transmission data and/or other data signals into corresponding data. For each coding on a transmitter side there may be a corresponding coding on receiver side and/or a coding may be reversible for decoding. A coding may be represented and/or comprise coding setting and/or parameters, for example AMC parameters. Two codings may be considered to be different from each other if they comprise different channel codes and/or different modulation formats.

AMC may also be called link adaptation and may refer to a method of adapting coding and/or modulation of signals, in particular by a network node, depending on signaling conditions, e.g. Signal-to-Noise and/or channel quality.

Blind detection on transmission data signals may comprise detection or determination of a coding used for a transmission data signals from and/or based on the transmission data signals themselves. in particular without prior knowledge of the coding used and/or without demodulation and/or decoding of the transmission data signals. Blind detection may for example be performed by estimating or calculating a measure of probability or likelihood of different codings of a set of codings to be the coding to be used for decoding and/or demodulating or used for encoding and/or modulating. Blind detection may comprise determining a best coding or candidate coding out of a set of codings based on a measure or probability of likelihood. Determining a coding may comprise identifying and/or extracting corresponding parameters and setting, e.g. by reading corresponding information from a memory. Blind detection may comprise determining that none of the codings of a set of coding associated, in particular uniquely associated, to the wireless device is a best coding or candidate if the measures of probability of the codings do not fulfill a minimum probability condition, e.g. the measures are below a pre-determined threshold for all the codings. Generally, there may be defined a minimum probability condition which a coding has to satisfy to be considered for use as coding. The wireless device may be adapted to determine that the transmission data signals are not intended for it if none of the codings of the set of codings fulfil the minimum probability condition. It may generally be considered that blind detection is performed based on operation and/or signaling conditions, in particular on SNR and/or channel quality, which may be determined based on measurements of the wireless device and/or indications provided by the network, in particular the network node transmitting the transmission data signals. Performing blind detection based on operation and/or signaling conditions may comprise choosing, by the wireless device and/or the blind detection module, a subset of the set of codings, which may be a real subset and/or smaller than the set of codings, for performing blind detection. The subset may be determined based on the operating and/or signaling conditions such that the codings of the subset are suitable for use in the conditions, in particular regarding modulation in comparison to SNR. Alternatively or additionally, blind detection may comprise decoding and/or demodulating the transmission data signals using a determined best coding and then performing an error detection decoding (e.g. CRC). The best coding may be determined to be correct, and for example determined to be used for further communication, and/or the transmission data signals may be determined to be intended for the wireless device if no error is detected and/or a pre-determined error threshold or error level is not exceeded.

Transmission data signals may be considered to be intended for a wireless device, if for encoding and/or modulation a coding associated to the wireless device is used and/or chosen by the network or network node, in particular a uniquely associated coding.

The wireless device may generally be adapted for, and/or comprise a configuration module for, configuring blind detection based on blind detection parameters received from the network, in particular a network node, which may be the network node transmitting transmission data signals to the wireless device. Blind detection parameters may comprise one or more threshold values (e.g., a minimum probability threshold), and/or an indication of codings or a set of codings associated to the wireless device, and/or information regarding the operation or signaling conditions, in particular regarding SNR. Configuring blind detection by the wireless device may comprise setting one or more than one threshold values (e.g. a minimum probability threshold), and/or setting a set of codings and/or choosing a subset of coding, e.g. based on operation and/or signaling conditions. A network node may be adapted for configuring a wireless device for blind detection, in particular by transmitting blind detection parameters to the wireless device.

Communicating, by the wireless device, in particular based on the blind detection, may comprise decoding and/or demodulating signals based on a best coding determined by blind detection. Alternatively or additionally, communicating may comprise receiving and/or in particular transmitting signals (e.g. in the uplink to a network node), by the wireless device, according to scheduling data, wherein the scheduling data may have been or be decoded and/or demodulated based on the blind detection and/or the best coding determined. Accordingly, by blind detecting the coding used, it is possible to extract (decode and/or demodulate) the transmission data and to determine the current settings, e.g. for AMC at the same time, from intrinsic characteristics of the signals. Using blind detection on scheduling data signals may provide scheduling information in particular for granted uplink communication or uplink transmission without requiring the transmission of coding information like AMC information.

A set of codings may comprise one or more codings. A set of codings assigned or available to a wireless device may comprise codings for decoding and/or demodulation of data signals, in particular transmission data signals.

Data signals, in particular transmission data signals, may comprise one or more bits and/or symbols of data. Data signals may be transmitted at given time/frequency resources, in particular in a downlink from a network or network node to a wireless device.

A coding or set of codings may be associated to a wireless device, e.g. by a network or network node, in particular for communication with the network or network node and/or via a cell and/or carrier and/or channel used by the network or network node to schedule the wireless device for communication. A set of codings may comprise more than one codings; the codings of a set of codings may be different from each other. Two set of codings may be considered to be different from each other if there is no coding in one of the sets which has similar characteristics (i.e. parity check matrix) as a coding in the other set and/or is equal to a coding in the other set. The coding or set of codings associated to a wireless device may pertain to the cell and/or carrier and/or channel utilised for scheduling. Transmissions and signals, in particular transmission data transmissions, to a wireless device may be encoded and/or modulated based one coding of the associated set of codings. At different times and/or for different data different codings may be used, e.g. depending on signal transmission conditions and/or signal quality, for example in the context of an Adaptive Modulation and Coding scheme. A set of codings associated to the wireless device may be available to the wireless device. A set of codings may be considered available to the wireless device if the wireless device, and/or control circuitry of the wireless device and/or a decoding and/or demodulating module of the wireless device, is able to use the codings of the set of coding for blind detection and/or decoding and/or demodulating of signals, in particular transmission data signals. One or more codings or sets of codings or corresponding information indication the codings or sets of codings may be stored in a memory of the wireless device to be accessible for the control circuitry and/or corresponding module/s.

A coding or set of codings may be uniquely associated to a wireless device if, in particular for blind detection and/or decoding and/or demodulation of transmission data signals, the coding or set of codings is only used by this wireless device and/or the coding or codings of the set of codings are different from the coding or codings of the sets of codings assigned or associated to other wireless devices. A coding or set of codings may be uniquely associated in particular pertaining to a cell provided by a network or network node and/or a carrier aggregation and/or a group of wireless devices within a given spatial region and/or cell and/or carrier aggregation provided and/or served by one or more than one network nodes. In particular, a coding or set of codings may be considered to be uniquely associated to a wireless device if a network node transmitting transmission data signals uses the coding or set of codings only for encoding and modulation of transmission data signals for the associated wireless device, and/or if the codings or sets of codings used for other wireless device or different from this coding or set of codings; the wireless device may be adapted for using the uniquely associated coding or set of codings, or a corresponding (reversed) coding or set of codings, for blind detection and/or decoding and/or demodulating in particular of transmission data signals. A coding or set of codings may be assigned to a wireless device to be uniquely associated to the wireless device for the wireless device and/or a network or network node; the coding or set of codings for the network node may be for encoding and/or modulating, and the coding or set of codings for the wireless device may be corresponding or identical codes for decoding and/or demodulating. Assigning the coding or set of coding to a wireless device may be performed by the network, e.g. by a network node, and be transmitted to the wireless device and the network node encoding and modulating. Alternatively, the network node performing the encoding and modulating may also assign the coding or set of codings.

Generally, a coding or set of codings may be assigned or associated to a wireless device by the network, in particular a network node. The associated or assigned coding or set of codings may be transmitted to the wireless device and/or the network or network node may indicate to the wireless device which of a number of codings or set of codings (which may be pre-defined and/or stored in a memory of the wireless device) are assigned or associated to it. It may be considered that codings or set of codings associated or assigned to a wireless device change over time, e.g. depending on network conditions and/or signal conditions. AQ user-specific channel code may be seen as an example for a coding uniquely assigned or associated to a wireless device.

A set of channel codes may be a set of codings including channel codes or be a sub-set of a set of codings including codings with both channel codes and modulation formats.

A syndrome posterior probability method may generally be a method a determining and/or estimating a best coding or candidate out of a set of codings for use as a coding to decode and/or demodulate transmission data signals. The method may in particular be performed as described herein.

A network node may be adapted for, and/or comprise an assigning module for, assigning a coding or set of coding to a wireless device. The assigning may be based on transmission or signaling conditions, e.g. signal quality and/or signal-to-noise ratio, in regards to the wireless device and/or to other wireless devices, the presence and/or use of other wireless device served by the network node, traffic load, quality and/or orthogonality of the codings used to each other, etc.

Encoding data may generally comprise encoding and/or modulation, in particular using a coding from a set of codings, e.g. a channel code and a modulation format of the coding, which may be (uniquely) associated to a wireless device intended as receiver of the data. Encoding based on data may comprise encoding of data utilizing a coding, with optional additional steps of data or signal manipulation like error detection coding (e.g. CRC), and may generally provide data signals, in particular encoding based on or of transmission data may provide transmission data signals.

Assigning a set of codings to a wireless device may comprise determining and/or choosing one or more codings to assign or associate to a wireless device. The codings may be determined or chosen based on a given codings set, which may be available to the network node and/or the wireless device. Determining one or more codings may comprise manipulating a base coding, e.g. a channel code, e.g. interleaving and/or scrambling the coding, for example with data specific to a wireless device the coding is to be associated with. The coding may be transmitted and/or indicate to the wireless device. The wireless device may generally be adapted for, and/or comprise a coding determining module for, determining a coding and/or a set of codings based on a transmission and/or indication from a network or network node. The wireless device and/or coding determining module may be adapted for manipulating a base coding, e.g. by corresponding interleaving and/or scrambling, to determine a coding of a set of codings, in particular based on an indication from the network and/or network node.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may be between nodes of a wireless communication network and/or in a wireless communication network. It may be envisioned that a node in or for communication, and/or in, of or for a wireless communication network is adapted for, and/or for communication utilizing, one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes of the communication. It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header. Each node involved in such communication may comprise radio circuitry and/or control circuitry and/or antenna circuitry, which may be arranged to utilize and/or implement one or more than one radio access technologies. Radio circuitry of a node may generally be adapted for the transmission and/or reception of radio waves, and in particular may comprise a corresponding transmitter and/or receiver and/or transceiver, which may be connected or connectable to antenna circuitry and/or control circuitry. Control circuitry of a node may comprise a controller and/or memory arranged to be accessible for the controller for read and/or write access. The controller may be arranged to control the communication and/or the radio circuitry and/or provide additional services. Circuitry of a node, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered. A node of a wireless communication network may be implemented as a Wireless device and/or user equipment and/or base station and/or relay node and/or any device generally adapted for device-to-device communication. A wireless communication network may comprise at least one of a device configured for device-to-device communication, a wireless device, and/or a user equipment and/or base station and/or relay node, in particular at least one user equipment, which may be arranged for device-to-device communication with a second wireless device or node of the wireless communication network, in particular with a second user equipment. A node of or for a wireless communication network may generally be a wireless device configured for wireless device-to-device communication, in particular using the frequency spectrum of a cellular and/or wireless communications network, and/or frequency and/or time resources of such a network. Device-to-device communication may optionally include broadcast and/or multicast communication to a plurality of devices or nodes. A cellular network may comprise a network node, in particular a radio network node, which may be connected or connectable to a core network, e.g. a core network with an evolved network core, e.g. according to LTE. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilizes the radio resources, in particular carriers and/or frequencies, and/or equipment (e.g. circuitry like radio circuitry and/or antenna circuitry, in particular transmitter and/or receiver and/or transceiver) provided and/or used for cellular operation.

A wireless device or user equipment (UE) may generally be a device configured for wireless device-to-device communication (it may be a wireless device) and/or a terminal for a wireless and/or cellular network, in particular a mobile terminal, for example a mobile phone, smart phone, tablet, PDA, etc. A user equipment may be a node of or for a wireless communication network as described herein, in particular a wireless device. It may be envisioned that a wireless device user equipment or wireless device is adapted for one or more RATs, in particular LTE/E-UTRA. A user equipment or wireless device may generally be proximity services (ProSe) enabled, which may mean it is D2D capable or enabled. It may be considered that a user equipment or wireless device comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A node or device of or for a wireless communication network, in particular a node or device for device-to-device communication, may generally be a user equipment or wireless device. It may be considered that a user equipment is configured to be a user equipment adapted for LTE/E-UTRAN.

A network node may be a base station, which may be any kind of base station of a wireless and/or cellular network adapted to serve one or more wireless device or user equipments. It may be considered that a base station is a node of a wireless communication network. A base station may be adapted to provide and/or define one or more cells of the network and/or to allocate or schedule frequency and/or time resources for communication to one or more nodes of a network and/or wireless devices in one or more of the cells provided, in particular UL resources. Generally, any node adapted to provide such functionality, in particular to provide transmission data signals, in particular control data signals, like e.g. scheduling data signals, may be considered a network node or base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver circuitry or device and/or transmitter circuitry or device and/or transceiver circuitry or device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network. Generally, a network node or base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station or network node, in particular according to LTE. A base station may generally be proximity service enabled and/or to provide corresponding services. It may be considered that a network node base station is configured as or connected or connectable to an Evolved Packet Core (EPC) and/or to provide and/or connect to corresponding functionality. The functionality and/or multiple different functions of a network node or base station may be distributed over one or more different devices and/or physical locations and/or nodes. A network node may be implemented, at least partly, such that its functionality is virtualized and/or distributed over more than one hardware component and/or may be a virtual network node.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Resources or communication resources may generally be frequency and/or time resources. Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first wireless device to transmit to and/or for a second wireless device. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation node, may be adapted to determine and/or transmit corresponding allocation data indicating release or de-allocation of resources to one or more wireless devices, in particular to a first wireless device. Accordingly, D2D resource allocation may be performed by the network and/or by a node, in particular a node within and/or within a cell of a cellular network covering the wireless devices participating or intending to participate in the D2D communication.

Allocation data may be considered to be data indicating and/or granting and/or scheduling resources allocated by the network node, in particular a controlling or allocation node, in particular data identifying or indicating which resources are reserved or allocated for D2D communication for a wireless device and/or which resources a wireless device may use for D2D communication and/or data indicating a resource grant or release. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE.

Cellular operation or communication (in particular by a wireless device or UE) may comprise any action or activity related to a cellular network (any one or more RATs). Some examples of cellular operation may be a radio signal transmission, a radio signal reception, performing a radio measurement, performing a mobility operation or RRM related to a cellular network. A wireless communication network may be implemented for cellular operation or communication. A cellular network, which may be a mobile or wireless communication network, may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT. RAT (radio access technology) may generally include: e.g. LTE FDD, LTE TDD, GSM, CDMA, WCDMA, WiFi, WLAN, WiMAX, etc.

A network node may be a controlling node connected or connectable to a wireless device for cellular and/or D2D communication. A network node, in particular a controlling node, may be defined by its functionality of providing transmission data signals, in particular control data signals like e.g. scheduling data signals, for or to one or more wireless devices, in particular to define which coding to be used for such data signals and/or to provide such data signals based on a coding, e.g. by encoding and/or modulating utilizing the coding and/or instructing another device or node to utilize the coding. A controlling node may be a network node that is adapted to schedule, decide and/or select and/or allocate, at least in part, time-frequency resources to be used for at least one of: cellular communication or transmissions and D2D communication or transmissions. The network node or controlling node may also provide scheduling information to another node, such as another wireless device, a cluster head, a radio network node such as eNodeB, or a network node (e.g. a core network node), MME, positioning node, D2D server, RNC, SON etc.). The network node or controlling node may be or communicate with a radio network node. It may be envisioned that a controlling node may also perform coordination and/or control for one or more wireless device or UEs. The coordination and/or control may be performed in a centralized or distributed manner. A controlling node may be referred to as an allocating node and/or a coordinating node.

A network device or node and/or a wireless device may be or comprise a software/program arrangement or program product adapted or arranged to be executable by at least one hardware device, e.g. control circuitry, and/or storable in a memory, causing the hardware device/s to perform and/or control any one of the method described herein.

A network node may generally be a radio network node (which may be adapted for wireless or radio communication, e.g. with a wireless device or a UE) or another network node. A network node generally may be a controlling node. Some examples of a radio network node or controlling node are a radio base station, in particular an eNodeB, a relay node, an access point, a cluster head, RNC, etc. The radio network node may be comprised in a cellular or mobile communication network and may support and/or be adapted for cellular operation or communication and/or D2D operation or communication.

A network node, in particular a radio network node, may comprise radio circuitry and/or control circuitry, in particular for wireless communication. Some examples of a network node, which is not necessarily a radio network node, may comprise: a core network node, MME, a node controlling at least in part mobility of a wireless device, SON node, O&M node, positioning node, a server, an application server, a D2D server (which may be capable of some but not all D2D-related features), a node comprising a ProSe function, a ProSe server, an external node, or a node comprised in another network. Any network node may comprise control circuitry and/or a memory.

A network node may be considered to be serving a wireless device or UE, if it provides a cell of a cellular network to the served node or wireless device or UE and/or is connected or connectable to the wireless device or UE via and/or for transmission and/or reception and/or UL and/or DL data exchange or transmission and/or if the network node is adapted to provide the wireless device or UE with allocation and/or configuration data and/or a measurement performance characteristic and/or to configure the wireless device or UE.

A wireless device (such as a UE) may be adapted for and/or capable of CA or CA operation. In particular, it may be adapted to transmit and/or receive one or more than one CCs and/or utilizing, and/or participating in, carrier aggregation. A wireless device may be adapted to configure itself and/or be configured according to configuration and/or allocation data, which may include setting up and/or scheduling resources and/or equipment for receiving and/or transmitting and/or sharing of resources and/or in particular D2D operation and/or cellular operation based on the configuration data. Configuration or allocation data may be received, by the wireless device, from another node or wireless device, in particular a network node.

A network node may generally be adapted to provide and/or determine and/or transmit configuration or allocation data and/or scheduling data signals, in particular to a wireless device. Configuration data may be considered to be a form of allocation data and/or may be provided in the form of a message and/or data packet/s. Configuring a wireless device or UE, e.g. configuring of the node by a network node, may include determining and/or transmitting configuration data to the node to be configured, i.e. the wireless device or UE. Determining the configuration data and transmitting this data to a wireless device or UE may be performed by different nodes, which may be arranged such that they may communicate and/or transport the configuration data between each other, in particular such that the node determining or adapted to determine the configuration data may transmit the configuration data to the node transmitting it or adapted to transmit it; the latter node may be adapted to receive the configuration data and/or relay and/or provide a message bases on the configuration data, e.g. by reformatting and/or amending and/or updating data received.

Cellular DL operation and/or communication of a wireless device or UE may refer to receiving transmissions in DL, in particular in cellular operation and/or from a network node/eNB/base station. Cellular UL operation of a wireless device or UE may refer to UL transmissions, in particular in cellular operation, e.g. transmitting to a network or network node/eNB/base station.

Each or any one of the wireless devices or user equipments shown in the figures may be adapted to perform the methods to be carried out by a user equipment or wireless device described herein. Alternatively or additionally, each or any of the wireless devices or user equipments shown in the figures may comprise any one or any combination of the features of a user equipment or wireless device described herein. Each or any one of the network nodes or controlling nodes or eNBs or base stations shown in the figures may be adapted to perform the methods to be carried out by network node or base station described herein. Alternatively or additionally, the each or any one of the controlling or network nodes or eNBs or base stations shown in the figures may comprise any one or any one combination of the features of a network node or eNB or base station described herein.

Some abbreviations used are:
3GPP 3$^{rd}$ Generation Partnership Project
Ack/Nack Acknowledgment/Non-Acknowledgement, also A/N
AP Access point
BER/BLER Bit Error Rate, BLock Error Rate;
BS Base Station
CA Carrier Aggregation
CoMP Coordinated Multiple Point Transmission and Reception
CQI Channel Quality Information
CRS Cell-specific Reference Signal
CSI Channel State Information
CSI-RS CSI reference signal
D2D Device-to-device
DL Downlink
EPDCCH Enhanced Physical DL Control CHannel
DL Downlink; generally referring to transmission of data to a node/into a direction further away from network core (physically and/or logically); in particular from a base station or eNodeB to a wireless device or UE; often uses specified spectrum/bandwidth different from UL (e.g. LTE)
eNB evolved NodeB; a form of base station, also called eNodeB
E-UTRA/N Evolved UMTS Terrestrial Radio Access/Network, an example of a RAT
f1, f2, f3, . . . , fn carriers/carrier frequencies; different numbers may indicate that the referenced carriers/frequencies are different
f1_UL, . . . , fn_UL Carrier for Uplink/in Uplink frequency or band
f1_DL, . . . , fn_DL Carrier for Downlink/in Downlink frequency or band
FDD Frequency Division Duplexing
ID Identity
IMSI International Mobile Subscriber Identity
L1 Layer 1
L2 Layer 2
LTE Long Term Evolution, a telecommunications or wireless or mobile communication standard
MAC Medium Access Control
MBSFN Multiple Broadcast Single Frequency Network
MDT Minimisation of Drive Test
MPC Measurement Performance Characteristic
NW Network
OFDM Orthogonal Frequency Division Multiplexing
O&M Operational and Maintenance
OSS Operational Support Systems
PC Power Control
PDCCH Physical DL Control CHannel
PH Power Headroom
PHR Power Headroom Report
PLMN Public Land Mobile Network
ProSe Proximity Service/s, another name for D2D
PSS Primary Synchronization Signal
PUSCH Physical Uplink Shared CHannel
RA Random Access
RACH Random Access CHannel
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SINR/SNR Signal-to-Noise-and-Interference Ratio; Signal-to-Noise Ratio
SFN Single Frequency Network
SON Self Organizing Network
SSS Secondary Synchronization Signal
TPC Transmit Power Control
TX transmission/transmitter, transmission-related
TDD Time Division Duplexing
UE User Equipment
UICC Universal Integrated Circuit Card; card used for mobile/cellular communication in a UE
UL Uplink; generally referring to transmission of data to a node/into a direction closer to a network core (physically and/or logically); in particular from a wireless device or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency These and other abbreviations may be used according to LTE standard definitions.

In this description, for purposes of explanation and not limitation, specific details are set forth (such as particular network functions, processes and signalling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

The invention claimed is:

1. A method for operating a wireless device in a wireless communication network, the method comprising:
   receiving, by the wireless device, transmission data signals from a network node of the wireless communication network;
   receiving, by the wireless device, blind detection parameters from the network node of the wireless communication network, wherein the received blind detection parameters comprise: one or more threshold values and an indication of a set of codings uniquely associated with the wireless device, and wherein the one or more threshold values are dependent on a number of wireless devices or users connected to the network node; and
   based on the set of codings and on the one or more threshold values comprised in the received blind detection parameters, performing blind detection on the transmission data signals.

2. The method according to claim 1, wherein a coding of the set of codings comprises at least one of: a channel code and a modulation format.

3. The method according to claim 1, wherein the received blind detection parameters further comprise an indication of a set of channel codes for the blind detection from the network node of the wireless communication network.

4. The method according to claim 1, wherein performing the blind detection comprises determining Adaptive Modulation and Coding (AMC) parameters of the transmission data signals.

5. The method according to claim 1, wherein performing the blind detection comprises:
   computing a syndrome posterior probability (SPP) for each coding within the set of codings; and
   selecting a coding from the set of codings that has the highest SPP.

6. A method for operating a network node in a wireless communication network, the method comprising:
   determining transmission data for a wireless device;
   encoding the transmission data to provide transmission data signals, the encoding being based on a coding, the coding being one of a set of codings uniquely associated to the wireless device;
   transmitting the transmission data signals to the wireless device;
   determining blind detection parameters based on operating conditions or signaling conditions, wherein the blind detection parameters comprise one or more threshold values, and wherein the one or more threshold values are dependent on a number of wireless devices or users connected to the network node; and
   transmitting the blind detection parameters to the wireless device.

7. The method according to claim 6, wherein the coding of the set of codings comprises at least one of: a channel code and a modulation format.

8. The method according claim 6, further comprising assigning the set of codings to the wireless device.

9. A method for operating a wireless communication network, the wireless communication network being in wireless connection with at least one wireless device, the method comprising:
   assigning a set of codings to a wireless device of the at least one wireless device, the set of codings being uniquely associated to the wireless device;
   determining transmission data for the wireless device;
   encoding the transmission data to provide transmission data signals, the encoding being based on one of codings in the set of codings that are uniquely associated to the wireless device;
   transmitting the transmission data signals to the wireless device;
   determining blind detection parameters based on operating conditions or signaling conditions, wherein the blind detection parameters comprise one or more threshold values, and wherein the one or more threshold values are dependent on a number of wireless devices or users connected to a network node of the wireless communication network; and
   transmitting the blind detection parameters to the wireless device.

10. The method according to claim 9, wherein one of the codings in the set of codings comprises at least one of: a channel code and a modulation format.

11. The method according to claim 9, further comprising receiving, by the wireless device, the transmission data signals.

12. The method according to claim 9, further comprising performing blind detection, by the wireless device, on the transmission data signals.

13. A wireless device for a wireless communication network, the wireless device comprising:

reception circuitry adapted to:
  receive transmission data signals from a network node of the wireless communication network; and
  receive blind detection parameters from the network node of the wireless communication network, wherein the received blind detection parameters comprise: one or more threshold values and an indication of a set of codings uniquely associated with the wireless device, and wherein the one or more threshold values are dependent on a number of wireless devices or users connected to the network node; and
control circuitry adapted to:
  use the set of codings and the one or more threshold values comprised in the received blind detection parameters, to perform blind detection on the transmission data signals.

14. The wireless device according to claim 13, wherein a coding of the set of codings comprises at least one of: a channel code and a modulation format.

15. The wireless device according to claim 13, wherein the received blind detection parameters further comprise an indication of a set of channel codes for the blind detection from the network node of the wireless communication network.

16. The wireless device according to claim 13, wherein, to perform the blind detection on the transmission data signals, the control circuitry is adapted to determine Adaptive Modulation and Coding (AMC) parameters of the transmission data signals.

17. The wireless device according to claim 13, wherein, to perform the blind detection on the transmission data signals, the wireless device is adapted to:
  compute a syndrome posterior probability (SPP) for each coding within the set of codings; and
  select a coding from the set of codings that has the highest SPP.

18. A network node for a wireless communication network, the network node comprising:
control circuitry, the control circuitry adapted to:
  determine transmission data for a wireless device wirelessly connected or connectable to the network node;
  encode the transmission data to provide transmission data signals, the encoding being based on a coding, the coding being one of a set of codings uniquely associated to the wireless device; and
  determine blind detection parameters based on operating conditions or signaling conditions, wherein the blind detection parameters comprise one or more threshold values, and wherein the one or more threshold values are dependent on a number of wireless devices or users connected to the network node; and
radio circuitry, the radio circuitry adapted to:
  transmit the transmission data signals to the wireless device; and
  transmit the blind detection parameters to the wireless device.

19. The network node according to claim 18, wherein the set of codings comprises one or more Adaptive Modulation and Coding (AMC) parameters.

20. The network node according to claim 18, the network node being adapted to assign the set of codings to the wireless device.

* * * * *